(12) United States Patent
Hiss et al.

(10) Patent No.: US 9,939,070 B2
(45) Date of Patent: Apr. 10, 2018

(54) VALVE DEVICE, USE OF SUCH A VALVE DEVICE AND ASSOCIATED SEALING DEVICE

(71) Applicant: HYDAC ACCESSORIES GMBH, Sulzbach/Saar (DE)

(72) Inventors: Helmut Hiss, Ispringen (DE); Markus Strupp, Noswendel (DE)

(73) Assignee: HYDAC ACCESSORIES GMBH, Sulzbach/Saar (DE)

( * ) Notice: Subject to any disclaimer, the term of this patent is extended or adjusted under 35 U.S.C. 154(b) by 162 days.

(21) Appl. No.: 14/944,277

(22) Filed: Nov. 18, 2015

(65) Prior Publication Data

US 2016/0146357 A1    May 26, 2016

(30) Foreign Application Priority Data

Nov. 26, 2014 (DE) .......................... 10 2014 017 453

(51) Int. Cl.
*F16K 5/20* (2006.01)
*F16K 5/06* (2006.01)

(52) U.S. Cl.
CPC ............ *F16K 5/201* (2013.01); *F16K 5/0689* (2013.01)

(58) Field of Classification Search
CPC ................................ F16K 5/201; F16K 5/0689

USPC ............................................ 251/315.01–317
See application file for complete search history.

(56) References Cited

U.S. PATENT DOCUMENTS

| 4,280,522 A * | 7/1981 | Pechnyo ............... F16K 5/0673 137/72 |
| 5,713,578 A * | 2/1998 | Terao ..................... F16J 15/164 277/582 |
| 2011/0147634 A1 * | 6/2011 | Hiss ...................... F16K 5/0636 251/315.03 |

* cited by examiner

Primary Examiner — Marina Tietjen
(74) Attorney, Agent, or Firm — Wenderoth, Lind & Ponack, L.L.P.

(57) ABSTRACT

A ball valve (1) has a blocking element (3) movably guided in a fluid passage of a valve housing (2) and movable by an actuating device (4) from a pass-through position connecting at least two connecting points (5) to one another in the valve housing (2) into a blocking position interrupting this connection, and vice versa. A sealing device has at least one sealing ring which, together with its central opening, comprises the fluid passage (6) and seals the fluid passage along at least one sealing gap. The ring profile of the sealing ring has a ring opening that interrupts this profile such that the sealing ring changes from an initial shape to an installation and different shape that seals the sealing gap with a predefinable pretension having an increased sealing force effect.

17 Claims, 4 Drawing Sheets

VALVE DEVICE, USE OF SUCH A VALVE DEVICE AND ASSOCIATED SEALING DEVICE

FIELD OF THE INVENTION

The invention relates to a valve device, in particular in the form of a ball valve, having a blocking element movably guided in a valve housing. The blocking element may be brought from a pass-through position connecting at least two connecting points to one another in the valve housing into a blocking position interrupting this connection, and vice versa, in a fluid passage by an actuating device. A sealing device having at least one sealing ring, together with its central opening, comprises the fluid passage and seals it along at least one sealing gap. The invention further relates to a use of such a valve device and a sealing device as a component or replacement part for such valve devices.

BACKGROUND OF THE INVENTION

A generic valve device of this type is known from EP 2 336 614 A1. In this known solution the respective sealing ring is received as part of the sealing device in a receiving groove of a sleeve-shaped sliding part. The sliding part, when acted upon by an energy store in the form of a corrugated spring washer assembly, abuts with a predefinable contact force the blocking element in the form of a ball body. The ball body is actuatable by a ball spindle and is guided for axial displacement along valve housing sections forming a guide, while delimiting the sealing gap. The sleeve-shaped sliding part is provided twofold and is assigned to the respective connection point of the valve housing disposed on opposite sides of the blocking element.

In the known solution, the respective sealing ring is formed from a closed O-ring made of elastomer material. While pretensioned in the respectively assignable receiving groove of the sleeve-like sliding part accommodated as a component of the entire sealing device, the O-ring is supported both against the groove base of the receiving groove and against the valve housing parts forming the guide for the respective sliding part, while sealing the sealing gap. The known valve device solution has proven extremely reliable in practice and is also used for high pressure applications. Furthermore, exchanging worn O-rings for new sealing rings when needed, in general, presents no difficulty. However, the known solution reaches its limits where any leakages occurring as a result of failure of the sealing device may be the starting point for disastrous fires and explosions on oil and gas platforms. The last major accident of the Deep Water Horizon in the Gulf of Mexico has becoming familiar to the broader public.

SUMMARY OF THE INVENTION

An object of the invention is to provide an improved valve device, also for high pressure applications, together with its components, such as the sealing device, so that the sealing device continues to remain fully functional, even in the event of fire, or at least over a longer period of use, and, can be used for use in risk areas, as is frequently the case on oil and natural gas platforms.

This object is basically achieved by a valve device having a ring profile of at least one sealing ring of the sealing device with a ring opening that interrupts this profile in such a way that the sealing ring changes from an initial shape to an installation shape differing therefrom. It seals the sealing gap that can be assigned thereto with a predefinable pretension having an increased sealing force effect.

Due to the interruption of the otherwise closed ring profile resulting from the preferably slit-shaped ring opening, the sealing ring can be expanded within predefinable limits, while increasing its inner diameter. This expansion defines its non-rounded initial shape and, with a contrastingly decreasing diameter, can be reset again to a potentially rounded installation shape up to a maximum end position, in which the adjacent ring ends abut one another when the ring opening is closed. If the sealing ring is preferably formed from a resilient material, in particular, from a suitable metal material, the reset movement following expansion occurs automatically. This reset helps to facilitate the fixing of sealing ring inside the valve device in the region of the sealing gap to be sealed during assembly.

A person of average skill in the art in the field of valve devices and the associated sealing technology would surprisingly find that good sealing results can be obtained with a slotted sealing ring that can assume a non-rounded initial shape. The results are comparable to an intrinsically closed O-ring shape, which, as explained, is preferably formed from a resilient elastomer material and, accordingly, once predefined, seeks in principle to maintain its roundness in any type of shape. The sealing ring according to the invention is first positioned in its installation shape inside the valve device with its walls and housing parts in such a way that the sealing ring extends through the sealing gap to be sealed with a predefinable pretension and, therefore, with increased sealing force effect. It abuts the wall portions and housing portions that delimit the sealing gap. A sufficiently effective sealing of media guided within the fluid passage from the environment is then achieved. The purpose of the "fire-safe" design according to the invention is to maintain the function over a certain period, in spite of external exposure to fire from the outside. Thus, whether the medium guided through the valve device is itself flammable is not of primary importance.

This sealing effect is improved still further if, in particular in the case of high temperature, which may also exist as a result of a fire, caused, for example, by easily ignitable media guided inside the fluid passage, such as methanol, or methane hydride. Those substances invariably arise when conveying natural gas. When transporting it, the slotted, preferably metallic sealing ring is expanded in the direction of its original initial shape and, as a result, increases the sealing force effect still further. Thus, even under extreme marginal conditions, which regularly exist in the case of fire, a safe functional sealing may be cost-effectively implemented and is easily maintained, while still achieved while complying with relevant safety standards.

The non-rounded sealing ring profile may also be obtained in a preferred embodiment of the valve device, in that the sealing ring in its initial shape has a slope in the form of a partial screw thread. The sealing ring later lies in its installation shape inside the valve device in a slope-free plane with an existing pretension as viewed in the axial direction. Invariably, a sealing is then achieved not only in the circumferential direction of the respective sealing ring, but also additionally or alternatively in its axial installation direction.

The ring ends of the sealing ring delimiting the ring opening may advantageously include locking parts having complementary shapes. The ring ends then lock one another, at least in the installation shape of the ring. Thus, the ring ends may be aligned relative to one another, such that both the ring opening prone to minimal leakage is optimally small, in particular, the abutting end face thereof that forms a seal has uniformly profiled.

To improve the sealing effect even more so in the case of high temperature, which can also exist as a result of fire, a sealing ring may include a surface, which is exposed to at least a portion of a media pressure varying within the fluid passage. Also, the sealing ring with its contact surface facing away from the surface may be supported at least indirectly on the valve housing in such a way that as the pressure of the medium increases, sealing surfaces of the locking parts facing one another, having complementary shapes, are pressed more forcefully together. A rapid increase of the medium pressure, as may occur, for example, in the heat build-up caused by fire or even in an explosion of a gaseous medium, results therefore in even further improvement of the sealing effect in the region of the sealing gap.

According to a particularly advantageous embodiment, the respective locking part forms the ring end and, as viewed in the circumferential direction of the sealing ring, forms a step. In the installation shape of the sealing ring, the respective step then comes into laterally reversed contact, preferably as an identical component, with the other step while forming a type of labyrinth. This labyrinth repeatedly diverts the leakage fluid flowing through the ring opening, so that the flow resistance is increased and, thus, the sealing function of the sealing ring is improved in the region of the ring opening.

In a particularly advantageous embodiment, the respective sealing ring is received in a receiving groove of a sleeve-shaped sliding part as a component of the sealing device. When acted upon by an energy store, preferably in the form of at least a plate spring, the sliding part abuts with a predefinable contact force the blocking element, and is guided for axial displacement along valve housing sections forming a guide while delimiting the sealing gap. This contact of the sliding part on the blocking element may also take place via a thin fluid film diverted from the fluid passage, to thereby ensure the lubrication of the actuatable blocking element, regularly in the form of a closure ball. The contact force in this case ensures a certain tightness against the blocking element, even in the event of thermal-related and wear-related changes in lengths of the various components of the valve device in this region.

In one advantageous embodiment, the respective sealing ring, which is arranged pretensioned radially, in its circumferential direction in the receiving groove of the sliding part, may extend through the sealing gap and abut with its radial pretension the guide for the sliding part formed by valve housing. According to one further development, the respective radially pretensioned sealing ring maintains a spacing on its inner circumferential side relative to the groove base of the receiving groove to avoid an "over-defined" reception in the installation position of the sealing ring in the receiving groove over too many potential contact points, which could adversely affect the sealing effect.

To improve even more, the already good sealing effect on the respectively slotted ring opening of the sealing device, multiple sealing rings are arranged in an axial aligned arrangement on the outer circumference of the sliding part. The ring openings of adjacent sealing rings are arranged circumferentially offset relative to one another. As a result, the free path for any occurring leakage fluid is increased, which likewise improves the desired sealing effect.

A particularly wear-resistant and thermally stable sealing ring is formed from a high temperature-resistant material and is made preferably of a non-corrosive heat-resistant chromium steel with a molybdenum additive.

The use of adjacent sealing rings of varying types ensures a tightness under varying marginal conditions, such as, for example, a sharply varying temperature. Thus, in addition to a sealing ring which, for reasons of fire protection, is especially high temperature-resistant, inter alia, a sealing ring, also made of elastomer material, which is less temperature-resistant but, by comparison, can be arranged and have an improved sealing effect. Accordingly, in addition to receiving the respective sealing ring of the one type, the sliding part includes at least one additional sealing ring of a different second type, which preferably interacts with at least one support ring. The respective additional second sealing ring and the respective support ring lie on the side of the sliding part facing away from the blocking element, in order to exclude them from the effects of higher temperatures, which could adversely affect their sealing effect.

In a particularly advantageous embodiment, the respective sealing ring of the other second type is arranged in additional receiving groove assigned thereto in the sliding part. As viewed in the radial direction, that sealing ring directly abuts with a predefinable pretension the groove base of this receiving groove and, as viewed in the direction of the passage, inasmuch also seals the sealing gap inwardly.

The valve device may be installed with no risk of confusion in the valve housing independently of the installment direction. For this purpose, the respective sealing device, having at least of one sealing ring and the sliding part, is disposed on both sides of the blocking element to the same extent. The respective sliding part has a cylindrical middle recess that is part of the fluid passage, which passage opens out to the fluid connection points of the valve housing on both sides of the valve.

In a particularly advantageous embodiment, even in the case of fire, a tightness is achieved for a predefined time span, even on the outwardly guided movable parts, such as, for example, an actuating shaft for the blocking element. For this purpose, the actuating device, rotatably guided in the valve housing, is sealed from the environment by a sealing ring set as an additional component of the sealing device. The sealing ring set includes at least one sealing ring of a third type, preferably, formed from a plurality of graphite rings arranged one on top of the other coaxially to the actuating axis of the blocking element, which respectively form the sealing ring of the third type.

To enable the use of components proven effective in practice, the valve housing may be composed at least partially of individual flange parts in the form of a building block. A part of the building block, as an additional component of the sealing device, additionally seals the inside of the valve housing from the environment by sealing rings of a fourth type, primarily in the form of metal C-rings.

The subject matter of the invention is also a use of the valve device according to the invention in the field of oil and natural gas platforms. It is designed fire-safe, at least in the area of the sealing device with sealing rings of the first type and, preferably of the fourth type, preferably complying with the fire safety standards pursuant to API607, API6FA and ISO 10497.

To account for the fact that sealing rings are subject to wear, the invention also relates to a sealing device having at least one sealing ring of the one type, used as a component or replacement part for the valve device according to the invention. The ring profile thereof includes a ring opening that interrupts the former in such a way that the sealing ring changes from an initial shape inside the valve device to an installation shape differing therefrom, in which it exerts an increased sealing force effect with a predefined pretension.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are basic and not to scale.

DETAILED DESCRIPTION OF THE INVENTION

Figure 1:
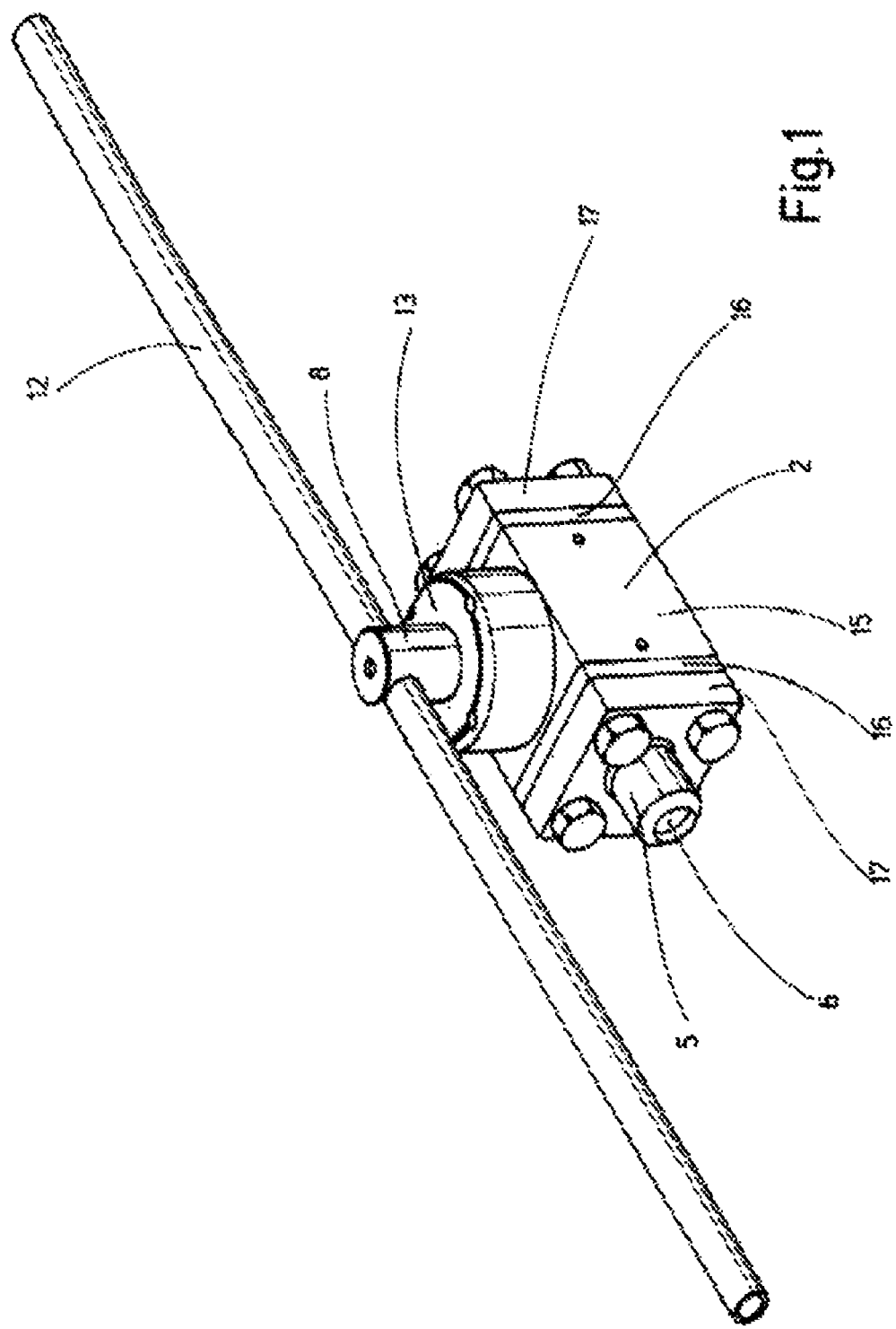
FIG. 1 is a perspective view of a valve device in the form of a ball valve according to an exemplary embodiment of the invention.

The valve device according to the invention is designed in the form of a ball valve 1. The ball valve 1 includes a valve housing 2, the lower portion of which is cube-shaped in design according to the depiction of FIG. 1, and cylindrical in design on its upper portion. A blocking element 3 is movably guided in the valve housing 2 and is designed as a valve ball, also referred to technically as a valve plug. The blocking element 3 may be moved in a fluid passage 6 by an actuating device 4 from a pass-through position (cf. FIGS. 2 and 3) connecting at least two connection points 5 to one another in the valve housing 2 into a blocking position (not depicted), which interrupts this connection and vice versa. In addition, the valve device according to the invention includes a sealing device having multiple sealing systems to be described in greater detail below.

The controllable blocking element 3 for closing off and releasing the flow path in the form of the fluid passage 6 has a bearing spindle 8, as part of the actuating device 4. The actuating device 4 has a longitudinal axis 7 perpendicular to the fluid passage 6 and is rotatably mounted in the valve housing 2, specifically, via bearing points 9 arranged inside the valve housing. The ball body, the valve ball designed as a blocking element 3, has a flow-through bore 10, which may be aligned in the housing 2 by rotating the ball spindle 8 relative to the bores 11 forming the medium passage, respectively, the fluid passage 6. To operate the ball valve by turning the ball spindle 8, a two-armed shift lever 12, which is connected via a coupling piece to the upper extension of the ball spindle 8 in the usual manner, and therefore not described in further detail, is located on an upper end section of the ball spindle 8. Connected to the coupling piece, in turn, is a limiting disc 13 that interacts on its circumference with stop pins 14 to limit the possible rotational movement of the ball spindle 8 to a maximum rotation of 90°. The rotary end positions of the ball spindle 8 correspond to the respective opened and closed positions of the blocking element 3.

Figure 2:
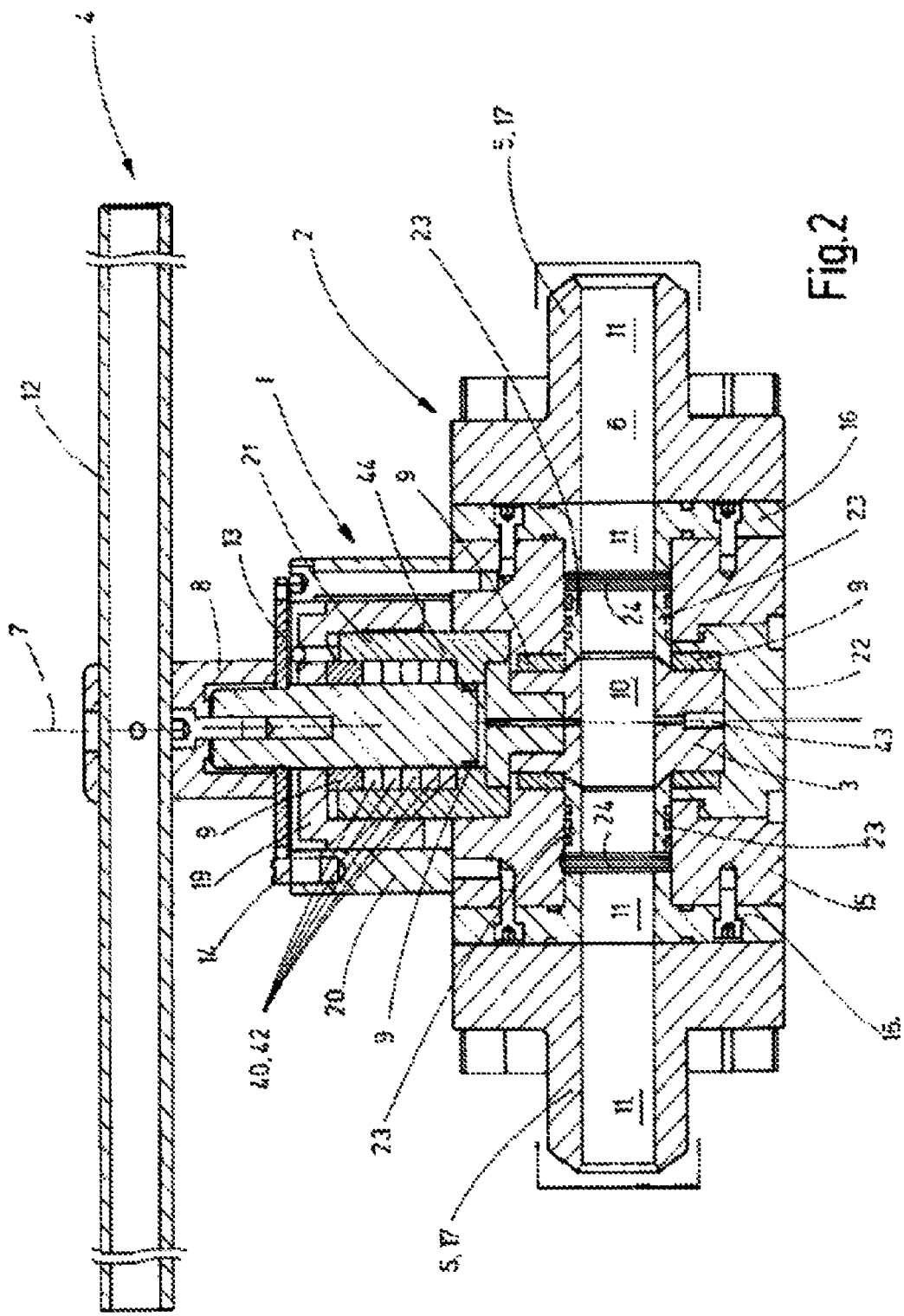
FIG. 2 is a side view in section of the ball valve of FIG. 1.
Figure 3:
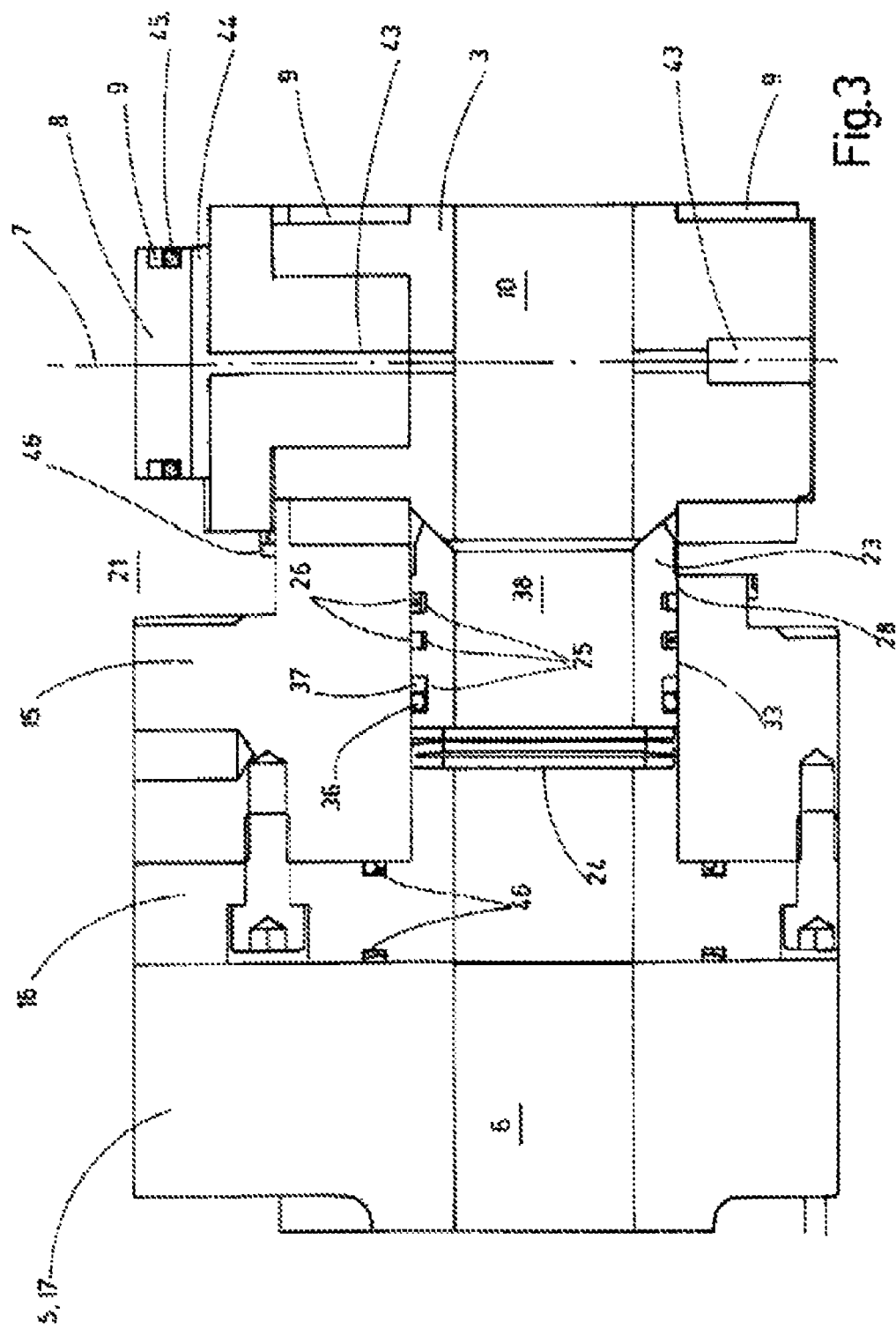
FIG. 3 is an enlarged view in section of the left portion of the ball valve of FIG. 2.

As shown in particular in FIG. 2, the valve housing 2 is a multi-part structure. The cube-shaped section is formed from an inner valve housing section 15, to which additional housing parts 16, 17 are connected toward the outside, which housing parts are designed as identical components. The upper cylindrical section of the valve housing 2 includes two upper housing parts 19 and 20 arranged concentrically to one another relative to the longitudinal axis 7. A pot-shaped receiving body 21 is provided as an additional housing part and supports bearing parts of the ball spindle 8 via the bearing points 9 (not depicted in detail). Also according to the depiction of FIG. 2, a bearing cap 22 is inserted into the valve housing 2 on the underside thereof. The bearing cap seals off the ball spindle 8 toward the bottom and supports the ball spindle 8.

A sealing shell, in the form of a sleeve-shaped sliding part 23, has a front sealing edge adapted to the outer curvature of the ball-shaped blocking element 3 and is located on each section bordering the ball-shaped blocking element 3 in the bores 11 forming the medium passage, respectively, fluid passage 6. Each respective sliding part 23 is guided to be longitudinally displaceable or movable in the inner valve housing part 15, and abuts the blocking element 3 with a predefined pretension force on its side facing away from blocking element 3 by an energy store in the form of a plate spring set 24. The respective plate spring set 24 in this case is supported with its one free end against the other front side of the sleeve-shaped sliding part 23 and with the other end against a free front end of the projecting additional housing part 16 of the valve housing 2. As shown, in particular, in FIG. 3, circumferentially guided annular receiving grooves 25 are introduced on the outer circumferential side of the sleeve-shaped sliding part 23, which serve to receive sealing rings of the entire sealing device. The two receiving grooves 25 arranged in pairs successively, which face the blocking element 3. Each groove receives a sealing ring 26, which comprises with its central opening 27 (cf. FIG. 4) the fluid passage 6 with the intermediately connected sliding part 23, and seals the fluid passage from the environment of the valve housing 2 along a sealing gap 28, which is formed at least partially by the outer circumference of the sleeve-shaped sliding part 23 and by the exposed inner circumference of the inner valve housing part 15. As is further shown in FIG. 4, the ring profile of the sealing ring 26 is provided with a ring opening 29, which interrupts this profile in such a way that the sealing ring 26 changes from an initial shape (not depicted) to an installation shape differing from the initial shape in accordance with the depictions in the figures, in which it seals the assignable sealing gap 28 with a predefinable pretension having an increased sealing force effect.

The ring opening 29 of the sealing ring 26 in this case, as viewed in the circumferential direction of the ring profile, has an initial shape larger than its installation shape shown, in which the ring opening 29 is otherwise substantially completely closed by the ring profile. If the sealing ring 26 is expanded, the inner cross-sectional area 30 thereof, which defines the central opening 27, is likewise larger than in the closed ring shape shown in the figures. Thus, in this respect, the initial shape of the sealing ring 26, based on its ring profile, is non-round, and its installation shape is round. In an alternative embodiment, not further depicted, as seen in the viewing direction of FIG. 4, the two ring ends 31 and 32 of the ring 26 can be pulled apart in the axial direction transverse to the circumferential direction of the sealing ring 26. A kind of slope for the sealing ring profile is then created with a resulting pretension, which later enables the sealing ring 26 in the installation position to exert a sealing force on the valve housing parts even in the axial direction parallel to the fluid passage 6. If the two ring ends 31, 32 according to the depiction of FIG. 4 are joined together again, counter to this axial pretension, the slope in question is eliminated, and the sealing ring 26 lies in a flat plane in its depicted installation form.

In another embodiment not depicted, the radial and axial pretension for the respective sealing ring 26 may also be "overlapping". However, the basic function of the respective sealing ring 26 is such that it is arranged pretensioned in its installation shape depicted in FIGS. 2 and 3, radially in its circumferential direction in the assignable receiving groove 25 of the sliding part 3. As such, sealing ring 26 extends with this pretension through the aforementioned sealing gap 28, and in this way abuts with its radial pretension the guide 33 for the sliding part 23 formed by the inner valve housing part 15 as part of the valve housing 2. In addition, as is only indicated in FIG. 3, the respective radially pretensioned sealing ring 26 is held on its inner circumferential side at a predefinable radial distance relative to the groove base of the receiving groove 25. In addition, two sealing rings 26 are arranged in axially aligned arrangement on the outer circumference of the sliding part 23. The ring openings 29 of adjacent sealing rings 26 are arranged circumferentially offset relative to one another. The respective sealing ring 26 is preferably formed from a high temperature-resistant material, preferably from a non-corrosive, heat-resistant chromium steel with a molybdenum additive.

Figure 4:
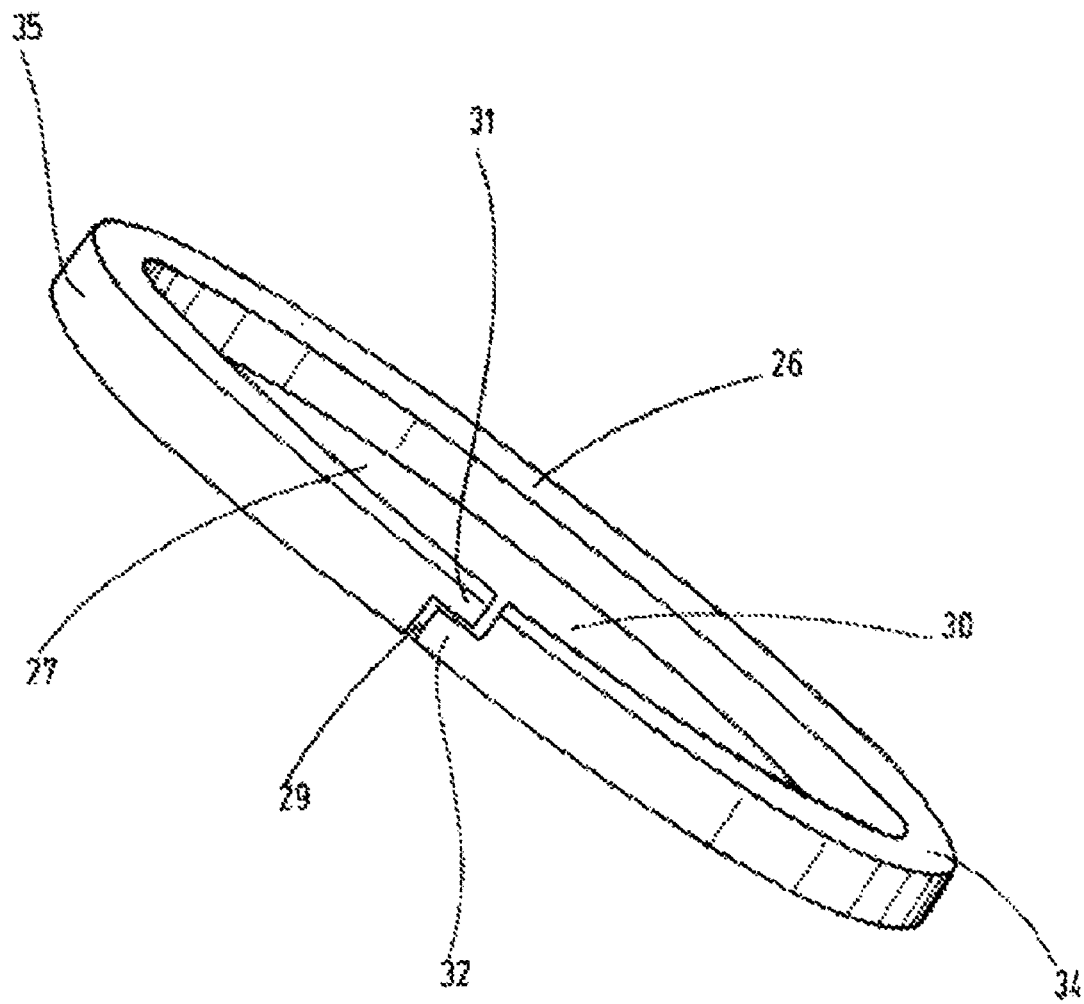
FIG. 4 is a perspective view of a sealing ring for the valve device of FIG. 1 in its installation shape.

As further shown in FIG. 4, the ring ends 31, 32 of the sealing ring 26 delimiting the slotted ring openings 29 having complementary shapes such that locking parts are formed. The locking parts enable the reciprocal locking of the ring ends 31, 32 and, therefore, the "closing" of the ring. In this way, a secure, tight locking of the ring ends 31 and 32 in the circumferential direction is provided, if the two ring ends 31, 32 are aligned with one another, which also applies in the case of the displacement in an axial direction extending transverse thereto. The front face of the sealing ring 26 has at least one sealing surface 34, which is subject at least partially to a varying media pressure prevalent inside the fluid passage 6. The respective sealing ring 26 is supported with its edge contact surface 35 facing away from this surface 34 at least indirectly on the valve housing 2 via the inner housing part 15. With increasing media pressure, sealing surfaces facing one another are pressed more forcefully together via the ring ends 31, 23 in the region of the complementarily formed locking parts. In this way, they are able to reliably effect sealing in the region of the ring opening 29. To retain such a locking part, a step is formed on the each of the ring ends 31, 32. In the installation shape of the sealing ring 26, the respective step comes into laterally reversed contact, preferably as an identical component, with the other step (see FIG. 4), while forming a type of labyrinth. In this way, a type of labyrinth is created having an increased sealing force effect in the region of the free ring ends 31, 32 which delimit the opening 29.

A high temperature-resistant sealing system in conjunction with the entire sealing device is implemented with the aforementioned sealing rings 26 of the one first type. However, the sliding part 23, in addition to the receiving potential for each sealing ring 26 of the one first type, also includes a second sealing ring 36 of the second type, which preferably interacts with at least one support ring 37. Each additional second ring 36 and each support ring 37 lie on the side of the sliding part 23 facing away from the blocking element 3. Thus, the sealing ring 36 of the second type is regularly formed from an elastomer material which, though it enables, in principle, a proper sealing of sealing gaps, has the disadvantage that it is temperature-sensitive. The combination of the support ring 37 and the elastomer O-ring 36 for guiding and sealing movable parts, such as the sliding part 23, is sufficiently known, so that details are not further discussed here.

In conformity with the sealing arrangement 26, the respective sealing ring 36 of the second type is also arranged in an assigned second receiving groove 25 in the sliding part 23. As viewed in the radial direction, sealing ring 36 is positioned directly, and with a predefinable pretension, abutting the groove base of this receiving groove 25. As viewed in the direction of the guide 33, sealing ring 36 seals the sealing gap 28. As previously mentioned, and as depicted, in particular, in FIG. 2, the respective sealing device is formed in this respect from two sealing systems having at least one rigid and slotted sealing ring 26 and one elastically resilient and self-contained O-ring 36. The thus constructed sealing system, having conceptually of two different types of sealing rings 26 and 36, is disposed on both sides of the blocking element 3. The middle recess 38 of each sleeve-shaped sliding part 23 is part of the fluid passage 6, which opens out on both sides of the valve housing 2 to the fluid connection points 5.

As previously explained, the actuating device 4 with spindle drive 8 is rotatably guided in the valve housing 2 and sealed from the environment by a sealing ring set 40 as an additional system component of the sealing device. At least one sealing ring of the third type 42 is provided, which is arranged in the valve housing 2 coaxially to the actuating axis of the blocking element 3, which coincides with the longitudinal axis 7 of the ball valve 1. Preferably, a plurality of graphite rings is present, arranged coaxially to this actuating axis of the blocking element, one on top of the other. Each graphite ring forms the sealing ring 42 of the third type. Such sealing rings 42 are retained compressed in an aligned arrangement as an additional valve housing part in the pot-shaped receiving body 21, which is integrated in a fixed arrangement in the upper part of the valve housing 2. A pressure compensation channel 43 is present in the ball-shaped blocking element 3 coaxially to the longitudinal axis 7. Channel 43 emanates from the flow-through bore 10 of the blocking element 3 and, as part of the spindle drive 8, discharges into a compensation chamber 44, which empties into the receiving chamber of the receiving body 21 with the graphite sealing rings 42 via an elastomer ring 42 as an additional sealing and the support ring arranged above it. The pressure compensation channel 43 and the pressure compensation chamber 44 serve as partial pressure compensation at the thrust collar of the spindle drive 8, in order to achieve a low switching torque under pressure when the blocking element 3 is in the pass-through position.

In addition to this seal, the valve housing 2, composed of individual flange parts and housing parts 15, 16, 17 as well as 19, 20 and 21, is designed in the form of a building block. A portion of these housing parts, in particular, the parts 17 and 12 employ, as an additional component of an additional sealing system, primarily metallic C-rings, which likewise seal the interior of the valve housing 2 from the environment.

The above described valve device is suited, in particular, for a use in the field of oil and natural gas platforms. Because it is designed as fireproof at least in the area of the sealing device with sealing rings of the first, the third and, preferably, the fourth type, it is possible to readily comply with predefined fire safety standards within a broad scope. In addition, the valve device as a whole is conceived in such a way that in the event of failure, a sealing ring of the one or other type may be readily exchanged on site. The valve device according to the invention may, however, also be employed, preferably, for example, in the field of process engineering, wherever, for the purpose of conveying media, it is connected to third components, which convey and control highly flammable fluids of any type or which are located in a highly flammable environment. Thus, the valve device solution described above has no counterpart in the prior art.

While one embodiment has been chosen to illustrate the invention, it will be understood by those skilled in the art that various changes and modifications can be made therein without departing from the scope of the invention as defined in the claims.

The invention claimed is:

1. A ball valve, comprising:
a valve housing having a fluid passage extending therein and connecting first and second connecting points;
a blocking element movably guides in said valve housing about an actuating axis between a pass-through position connecting said first and second connecting points in fluid communication and a blocking position interrupting connection of said first and second connecting points in fluid communication;
an actuator being rotatably guided in said valve housing about said actuating axis and being coupled to and moving said blocking element between said pass-through position and said blocking position;
a sealing device having a first sealing ring with a central opening, said sealing ring forming said fluid passage, said first sealing ring having a ring opening interrupting a ring profile thereof such that said first sealing ring changes from an initial shape to an installation shape where said initial shape and said installation shape are different and where said first sealing ring seals said fluid passage along a sealing gap with a predefinable pretension increasing a sealing force effect thereof in said installation shape; and
a sealing ring set having a plurality of graphite rings arranged one on top of one another and arranged coaxially along said actuating axis sealing said actuator in said valve housing relative to an environment surrounding said valve housing.

2. A ball valve according to claim 1 wherein
said ring opening of said first sealing ring is in at least one of a circumferential direction of said ring profile or of an axial direction transverse to said circumferential direction, said initial shape being larger than said installation shape, said ring opening being closed in said installation shape.

3. A ball valve according to claim 2 wherein
said initial shape of said first sealing ring is at least one of non-round or sloped; and
said installation shape of said first sealing ring is round and lies in a flat plane.

4. A ball valve according to claim 1 wherein
said first sealing ring comprises ring ends delimiting said ring opening and including locking parts having complementary shapes formed to lock one another in said installation shape.

5. A ball valve according to claim 4 wherein
said first sealing ring comprises a ring surface subjected to media pressure within said fluid passage and a contact surface facing away from said ring surface supported at least indirectly on said valve housing such that sealing surfaces being complementarily formed on locking parts of said ring ends and facing one another are pressed more forcefully together as the media pressure increases.

6. A ball valve according to claim 5 wherein
each of said locking parts forms one of said ring ends and comprises a step in a circumferential direction of said first sealing ring, said steps being identical and coming into laterally reversed contact and forming a labyrinth.

7. A ball valve according to claim 1 wherein
said first sealing ring is received in a first receiving groove of a sleeve-shaped first sliding part abutting said blocking element with a predefinable contact force applied on said first sliding part by an energy store, said first sliding part being guided for axial displacement along housing sections forming a guide and delimiting said sealing gap.

8. A ball valve according to claim 7 wherein
said energy store comprises a plate spring.

9. A ball valve according to claim 1 wherein
said first sealing ring is pretensioned radially outwardly in the installation position, is located in a receiving groove of a sliding part in said sealing gap and abuts with radial pretension thereof a guide for said sliding part formed by said valve housing.

10. A ball valve according to claim 9 wherein
said first sealing ring maintains a spacing on an inner circumferential side of said first sealing ring relative a groove base of said receiving groove.

11. A ball valve according to claim 1 wherein
said sealing device comprises multiple ones of said first ring sealing in an axially aligned arrangement on an outer circumference of a sliding part in said valve housing, adjacent ones of said first sealing rings having ring openings circumferentially offset relative to one another.

12. A ball valve according to claim 1 wherein
said first sealing ring is formed of a non-corrosive, heat-resistant chromium steel with a molybdenum additive.

13. A ball valve according to claim 7 wherein
said sealing device comprises a second sealing ring on said sliding part, said first and second sealing rings being different types, and second sealing ring interacting with a support ring on said first sliding part, said second sealing ring and said support ring being on an axial end of said first sliding part facing away from said blocking element.

14. A ball valve according to claim 13 wherein
said second sealing ring is arranged in a second receiving groove in said first sliding part, directly abuts with a predefineable pretension a groove base of said second sealing groove and seals said sealing gap in a direction of said guide.

15. A ball valve according to claim 14 wherein
a sleeve-shaped second sliding part is located in said valve housing on a side of said blocking element opposite said first sliding part, each of said sliding parts having at least one of said fluid sealing ring and at least one of said second sealing ring, each of said sliding parts having a middle recess being a part of said fluid passage and emptying into said fluid connection points on both sides of said valve housing.

16. A ball valve according to claim 1 wherein
said valve housing comprises individual flange parts in a forms of building blocks, at least one of said flange parts being a component of said sealing device sealing an interior of said valve housing from the environment by C-shaped sealing rings.

17. A ball valve according to claim 1 wherein
in fields of oil and natural gas platforms, said sealing device is fire-safe with said first sealing ring and said graphite rings complying with fire safety standards pursuant to API607, API6FA and ISO 10497.

* * * * *